United States Patent
Souiai et al.

(10) Patent No.: US 12,406,397 B2
(45) Date of Patent: Sep. 2, 2025

(54) CONCURRENT CAMERA CALIBRATION AND BUNDLE ADJUSTMENT

(71) Applicant: Magic Leap, Inc., Plantation, FL (US)

(72) Inventors: Mohamed Souiai, Plantation, FL (US); Ankur Gupta, Plantation, FL (US); Igor Napolskikh, Plantation, FL (US)

(73) Assignee: Magic Leap, Inc., Plantation, FL (US)

( * ) Notice: Subject to any disclaimer, the term of this patent is extended or adjusted under 35 U.S.C. 154(b) by 373 days.

(21) Appl. No.: 18/245,816

(22) PCT Filed: Aug. 17, 2021

(86) PCT No.: PCT/US2021/046241
§ 371 (c)(1),
(2) Date: Mar. 17, 2023

(87) PCT Pub. No.: WO2022/060507
PCT Pub. Date: Mar. 24, 2022

(65) Prior Publication Data
US 2024/0046521 A1  Feb. 8, 2024

Related U.S. Application Data

(60) Provisional application No. 63/079,809, filed on Sep. 17, 2020.

(51) Int. Cl.
*G06T 7/80* (2017.01)
*G06T 19/00* (2011.01)

(52) U.S. Cl.
CPC ........... *G06T 7/85* (2017.01); *G06T 19/00* (2013.01); *G06T 2207/10012* (2013.01); *G06T 2207/30244* (2013.01)

(58) Field of Classification Search
CPC . G06T 7/85; G06T 19/00; G06T 2207/10012; G06T 2207/30244
See application file for complete search history.

(56) References Cited

U.S. PATENT DOCUMENTS 8,736,636 B2   5/2014   Kang
8,793,770 B2   7/2014   Lim
(Continued)

OTHER PUBLICATIONS

Furukawam et al. "Accurate camera calibration from multi-view stereo and bundle adjustment." International Journal of Computer Vision 84 (2009): 257-268. (Year: 2009).*
(Continued)

*Primary Examiner* — Daniel F Hajnik
*Assistant Examiner* — Jed-Justin Imperial
(74) *Attorney, Agent, or Firm* — Fish & Richardson P.C.

(57) ABSTRACT

Methods, systems, and apparatus, including computer programs encoded on computer storage media, for camera calibration during bundle adjustment. One of the methods includes maintaining a three-dimensional model of an environment and a plurality of image data clusters that each include data generated from images captured by two or more cameras included in a device. The method includes jointly determining, for a three-dimensional point represented by an image data cluster (i) the newly estimated coordinates for the three-dimensional point for an update to the three-dimensional model or a trajectory of the device, and (ii) the newly estimated calibration data that represents the spatial relationship between the two or more cameras.

20 Claims, 4 Drawing Sheets

(56) References Cited

U.S. PATENT DOCUMENTS

| | | | |
|---|---|---|---|
| 8,823,855 | B2 | 9/2014 | Hwang |
| 8,874,673 | B2 | 10/2014 | Kim |
| 9,177,384 | B2* | 11/2015 | Weisenburger ........... G06T 7/20 |
| 2005/0283328 | A1 | 12/2005 | Tashev |
| 2015/0036888 | A1 | 2/2015 | Weisenburger |
| 2016/0292867 | A1 | 10/2016 | Martini |
| 2017/0122733 | A1* | 5/2017 | Brown ...................... G06T 7/97 |
| 2020/0011668 | A1* | 1/2020 | Derhy .................... G06V 20/56 |

OTHER PUBLICATIONS

Ericksson et al., "A Consensus-Based Framework for Distributed Bundle Adjustment," Paper, Presented at Proceedings of the 2016 IEEE Conference on Computer Vision and Pattern Recognition (CVPR), Las Vegas, NV, Jun. 27-30, 2016, pp. 1754-1762.

International Search Report and Written Opinion in International Appln. No. PCT/US2021/046241, mailed on Nov. 16, 2021, 10 pages.

Parikh and Boyd, "Proximal Algorithms," Foundations and Trends in Optimizaoni, 2013, 1(3):123-231, 113 pages.

Wikipedia.org [online], "Hilbert space," Apr. 17, 2020, retrieved on May 6, 2020, retrieved from URL<https://en.wikipedia.org/w/index.php?title=Hilbert_space&oldid=951495500>, 35 pages.

Wikipedia.org [online], "Indicator function," Apr. 25, 2020, retrieved on May 6, 2020, retrieved from URL<https://en.wikipedia.org/w/index.php?title=Indicator_function&oldid=953067844>, 6 pages.

Zhang et al., "Distributed very large scale bundle adjustment by global camera consensus," IEEE Trans Pattern Anal Mach Intell., Feb. 2020, 42(2):291-303, 10 pages.

* cited by examiner

CONCURRENT CAMERA CALIBRATION AND BUNDLE ADJUSTMENT

CROSS REFERENCE TO RELATED APPLICATIONS

The present application is a National Stage Application of International Application No. PCT/US2021/046241, filed Aug. 17, 2021, which claims the benefit of U.S. Provisional Patent Application No. 63/079,809, filed Sep. 17, 2020, both of which are incorporated herein by reference in their entirety.

BACKGROUND

Augmented reality ("AR") and mixed reality ("MR") devices can include multiple sensors. Some examples of sensors include cameras, accelerometers, gyroscopes, global positioning system receivers, and a magnetometer, e.g., a compass.

An AR device can receive data from multiple sensors and combine the data to determine an output for a user. For instance, an AR device can receive gyroscope and camera data from respective sensors and, using the received data, present content on a display. The AR device can generate an environment map using the sensor data, e.g., camera data, and use the environment map to present the content on the display.

SUMMARY

Computer vision systems can generate three-dimensional ("3D") models, e.g., map, of an environment using image data. As a part of this process, computer vision systems can perform bundle adjustment to optimize the estimated positions at which a device captured images, e.g., key frames, and determines a group of 3D points. The 3D points can be voxels, vertices, or other appropriate data that represent locations in a virtual environment model. The system can use the 3D points to update or create the 3D model of the environment. The device can be an AR device, an MR device, or a combination of the two. For instance, the device can be an AR headset. The 3D points can represent points the computer vision system determines are depicted within the images.

As part of the model creation process, the system can use data that indicates a location of the device with respect to the environment when the device captured respective images of the environment. The location of the device can include a position of the device in the environment, an orientation of the device, or both. The position, orientation, or both, can be with respect to a prior location of the device, e.g., a location at which the device captured an image after the device is powered on. When components of the device move with respect to each other, e.g., when the device deforms or is otherwise miscalibrated, the location data can become inaccurate. This can occur when the device includes multiple sensors, such as two or more cameras, that capture data used for the model creation process.

To increase the accuracy of the location data, the system can determine calibration data for the device that represents locations of various components included in the device. For instance, the calibration data can indicate a location of a component, such as a camera, with respect to another part of the device, such as another camera.

When the system performs bundle adjustment based on a particular set of images, the system can determine calibration data for the device when the device captured the particular set of images. The set of images can include two or more images, each image captured by a respective camera in the device. The calibration data can represent locations of the cameras that captured one or more image sets. During the bundle adjustment process, the system can determine the calibration data, a global device position, an update for the 3D model of the environment, or a combination of two or more of these. The system can then use the calibration data, the global device position, the 3D model of the environment, or a combination of these, during future bundle adjustment processes, when generating augmented reality data or mixed reality data, or both.

The location of a camera can include the position, orientation, or both, of the camera with respect to another camera in the device. For example, the location of a first camera can include the position and orientation of the first camera with respect to each of the other cameras in the device, e.g., a second camera, a third camera, etc. The position of the camera can be with respect to a global position. The system can determine the global position, e.g., can estimate a position using bundle adjustment and determine to use that estimated position as the global position.

The system can perform the analysis using clusters of image data. The clusters include image data from two or more images, e.g., at least one set of images. A set of images can be two images that were captured by two cameras in a stereo setup substantially concurrently. A cluster can include image data for a set of images, or a subset of the image data for the set of images, e.g., image data for the lower-left corners of each of the images. In some examples, a cluster can include image data for two or more sets of images when the images depict an area of a physical environment, e.g., when each of the images depict at least part of the same area of the physical environment.

In general, one aspect of the subject matter described in this specification can be embodied in methods that include the actions of maintaining, in memory: a three-dimensional model of an environment, and a plurality of image data clusters that each include data generated from images captured by two or more cameras included in a device, wherein the images represent a portion of the environment in which the device was located; and jointly determining, for a three-dimensional point represented by an image data cluster from the plurality of image data clusters and using (i) previously estimated coordinates for the three-dimensional point, (ii) the image data cluster, (iii) previously estimated calibration data that represents a spatial relationship between the two or more cameras, (iv) newly estimated coordinates for the three-dimensional point, and (v) newly estimated calibration data that represents the spatial relationship between the two or more cameras: the newly estimated coordinates for the three-dimensional point for an update to the three-dimensional model or a trajectory of the device; and the newly estimated calibration data that represents the spatial relationship between the two or more cameras.

Other embodiments of this aspect and other aspect disclosed herein include corresponding computer systems, apparatus, computer program products, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. The device can be an extended reality, e.g., augmented or virtual device. Jointly determining the newly estimated coordinates, and the newly estimated calibration data can include jointly determining, for the three-dimensional point represented by the image data cluster from the plurality of image data clusters: the newly estimated coordinates; the newly estimated calibration data; and (i) an updated three-dimensional model or (ii) a trajectory of the device in the environment that includes a physical location for the three-dimensional point.

In some implementations, jointly determining the newly estimated coordinates, and the newly estimated calibration data can include jointly determining, for the three-dimensional point represented by the image data cluster from the plurality of image data clusters: the newly estimated coordinates; the newly estimated calibration data; the updated three-dimensional model; and the trajectory of the device in the environment that includes a physical location for the three-dimensional point. The method can include presenting, on a display, content for the environment using i) the updated three-dimensional model or ii) the trajectory of the device in the environment or iii) both. The method can include presenting, on a display, content for the environment using i) the updated three-dimensional model or ii) the trajectory of the device in the environment. The display can be incorporated into the device, e.g., into an extended reality device. The display can include one or more eyepieces, e.g., as part of an extended reality device.

In some implementations, determining the newly estimated coordinates can include iteratively determining the newly estimated coordinates by, for each of two or more iterations: determining newly estimated coordinates for the three-dimensional point using previously estimated coordinates for the three-dimensional point, the image data cluster, and previously estimated calibration data that represents a spatial relationship between the two or more cameras; determining whether a convergence threshold is satisfied; and upon determining that the convergence threshold is not satisfied during at least one of the two or more iterations: setting the newly estimated coordinates for the three-dimensional point as the previously estimated coordinates for the three-dimensional point; and performing a next iteration using the newly estimated; or upon determining that the convergence threshold is satisfied during at least one of the two or more iterations, determining to store the newly estimated coordinates for the three-dimensional point.

In some implementations, the method can include determining, for each of one or more other image data clusters from the plurality of image data clusters that each include data for the three-dimensional point, another newly estimated coordinate for the three-dimensional point. Setting the newly estimated coordinates for the three-dimensional point as the previously estimated coordinates for the three-dimensional point can include: averaging the newly estimated coordinates for the three-dimensional point and each of the one or more other newly estimated coordinates for the three-dimensional point to determine average estimated coordinates; and setting the average estimated coordinates for the three-dimensional point as the previously estimated coordinates for the three-dimensional point.

In some implementations, the method can include: averaging, for a first image data cluster and a second image data cluster included in the plurality of image data clusters, a first previously estimated coordinate for the first image data cluster and a second previously estimated coordinate for the second image data cluster to determine an averaged previously estimated coordinate; and averaging first previously estimated calibration data for the first image data cluster and second previously estimated calibration data for the second image data cluster to determine averaged previously estimated calibration data. Jointly determining the newly estimated coordinates for the three-dimensional point and the newly estimated calibration data using the previously estimated coordinates and the previously estimated calibration data can include jointly determining the newly estimated coordinates for the three-dimensional point and the newly estimated calibration data using the averaged previously estimated coordinates and the averaged previously estimated calibration data.

In some implementations, the calibration data can include translation data, rotation data, and an estimated location data. Averaging first previously estimated calibration data for the first image data cluster and second previously estimated calibration data for the second image data cluster to determine averaged previously estimated calibration data can include: averaging first translation data for the first image data cluster with second translation data for the second image data cluster; averaging first rotation data for the first image data cluster with second rotation data for the second image data cluster; and determining to skip averaging a first estimated location data for the first image data cluster and second estimated location data for the second image data cluster. Jointly determining the newly estimated coordinates for the three-dimensional point and the newly estimated calibration data using the averaged previously estimated coordinates can include, substantially concurrently: determining first newly estimated coordinates for the first image data cluster using the first image data cluster and a first copy of the average previously estimated coordinates; determining second newly estimated coordinates for the second image data cluster using the second image data cluster and a second copy of the average previously estimated coordinates; determining first newly estimated calibration data for the first image data cluster using the first image data cluster and a first copy of the average previously estimated calibration data; and determining second newly estimated calibration data for the second image data cluster using the second image data cluster and a second copy of the average previously estimated calibration data. The first image data cluster and the second image data cluster can include image data for adjacent regions in the three-dimensional model. The first image data cluster can include image data captured during a first time period. The second image data cluster can include image data captured during a second time period that is adjacent to the first time period.

In some implementations, determining the newly estimated coordinates or determining the newly estimated calibration data as part of the joint determination can include: receiving, from a first proximity operator, a first partial newly estimated value that the first proximity operator determined using a previously estimated partial value, data for an projection of a point for the image data cluster onto the three-dimensional model, a step size parameter, and a visibility matrix; receiving, from a second proximity operator, a second partial newly estimated value that the second proximity operator determined using the image data cluster and the visibility matrix; and combining the first partial newly estimated value and the second partial newly estimated value to determine the newly estimated value. The method can include receiving data for a plurality of images captured by the two or more cameras; and determining, using the plurality of images, the plurality of image data clusters that each include data for two or more images that depict the same portion of the environment in which the device was located. The two or more images can be included in the plurality of images.

In some implementations, jointly determining the newly estimated coordinates and the newly estimated calibration data can include: providing, to a proximal splitting engine, the previously estimated coordinates for the three-dimensional point, the image data cluster, and the previously estimated calibration data that represents a spatial relationship between the two or more cameras; and receiving, from the proximal splitting engine, the newly estimated coordinates and the newly estimated calibration data. Jointly determining the newly estimated coordinates and the newly estimated calibration data can include: providing, to a first proximal splitting engine, the previously estimated coordinates for the three-dimensional point, the image data cluster, and the previously estimated calibration data that represents a spatial relationship between the two or more cameras; receiving, from the first proximal splitting engine, the newly estimated coordinates; providing, to a second proximal splitting engine, the image data cluster, and the previously estimated calibration data that represents a spatial relationship between the two or more cameras; and receiving, from the second proximal splitting engine, the newly estimated calibration data.

In some implementations, the calibration data can identify, for a pair of cameras in the two or more cameras, a rotation parameter and a translation parameter that represent the spatial relationship between the pair of cameras. The calibration data can identify, for a pair of cameras in the two or more cameras, a location of the camera with respect to the environment. The environment can be a physical environment. The method can include capturing, by each of two or more cameras and substantially concurrently, an image of the environment; and generating, using the two or more images each of which was captured by one of the two or more cameras, three-dimensional data that includes, for an object depicted in each of the two or more images, a three-dimensional point for a feature of the object.

The subject matter described in this specification can be implemented in various embodiments and may result in one or more of the following advantages. In some implementations, a system can determine calibration data for a device as part of a bundle adjustment process to improve an accuracy of data generated during the bundle adjustment process. For instance, the system can use three-dimensional points and calibration data estimated during the bundle adjustment process to determine a device trajectory, a map of an environment in which the device is located, or both. In some implementations, when the device performs bundle adjustment for images captured by the device, e.g., online bundle adjustment, the device can complete the bundle adjustment process more quickly by performing bundle adjustment using calibration data as input compared to other systems. In some implementations, the systems and processes described in this document can determine more accurate calibration data.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
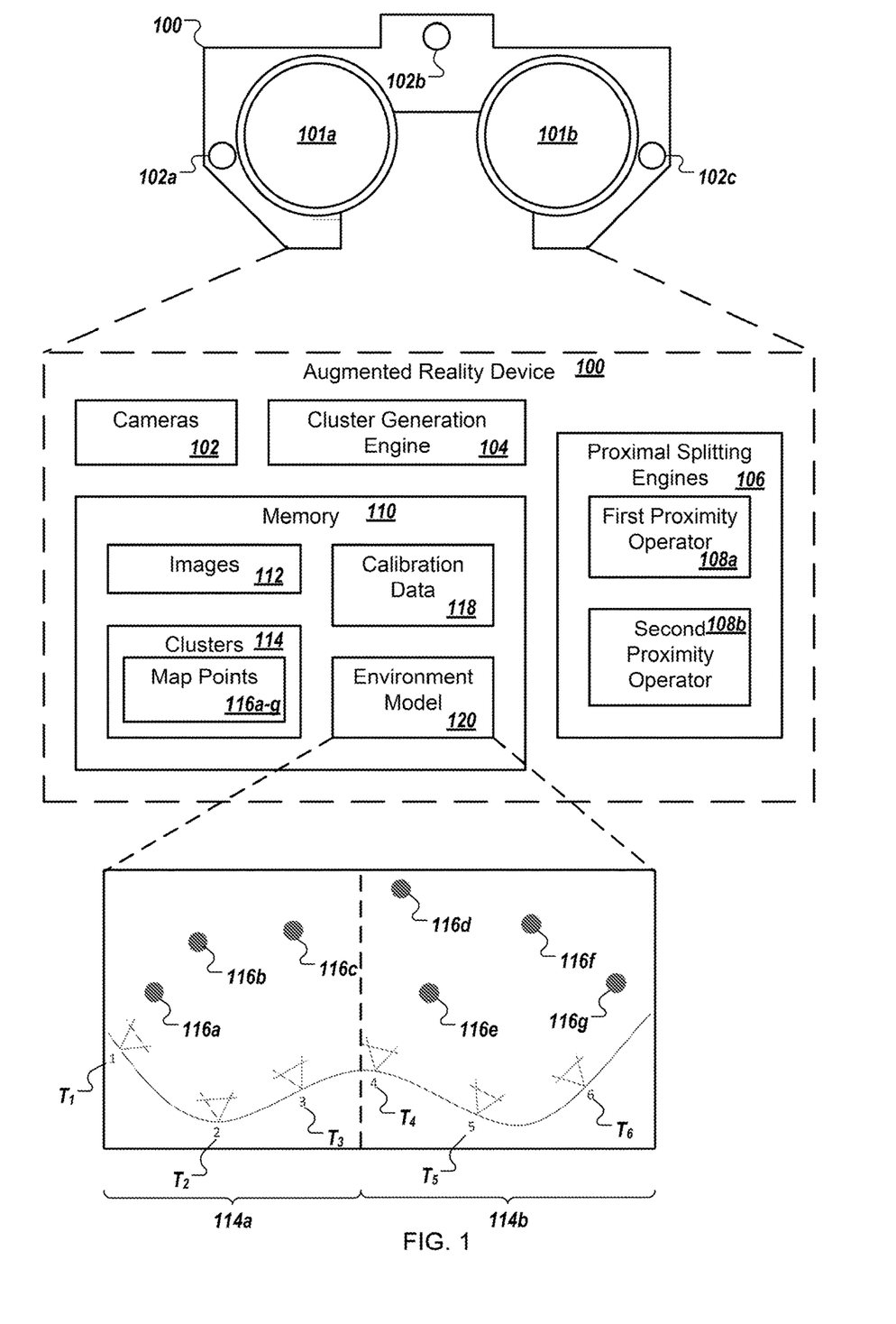
FIG. 1 depicts an example augmented reality device.

FIG. 1 depicts an example augmented reality device 100. The augmented reality device 100 is an example of a computer vision system that uses image data to generate an environment model 120, e.g., a three-dimensional ("3D") model of an environment depicted in images 112 captured by cameras 102 and represented by the image data. The augmented reality device 100 can present content, e.g., images, using the 3D model on display devices 101a-b, e.g., eyepieces, included in the augmented reality device 100.

The augmented reality device 100 can use a bundle adjustment process to analyze the image data and determine 3D points that represent features of objects depicted in the images. The augmented reality device 100 can use the 3D points to generate an environment model 120, e.g., the 3D model.

To improve the accuracy of the environment model 120 in reflecting the environment depicted in the images 122, the augmented reality device 100 uses calibration data 118. The calibration data 118 represents spatial calibration properties of the augmented reality device 100. For instance, the calibration data 118 can represent a distance between a first camera 102a and a second camera 102b, e.g., a spatial relationship between the first camera 102a and the second camera 102b.

As the augmented reality device 100 moves through the environment, some of the components of the augmented reality device 100 can move with respect to other components. The movement can be caused by temperature changes, e.g., heat or cold, pressure changes, or other external sources, e.g., when a person presses against or picks up the augmented reality device 100.

To account for these differences, the augmented reality device 100 updates the calibration data 118 as the augmented reality device 100 moves through the environment. For example, the calibration data 118 can indicate a first distance, a first rotation, or both, that associate the first camera 102a and the second camera 102b. When the augmented reality device 100 experiences a pressure on the left side of the augmented reality device 100, the augmented reality device can determine updated calibration data 118 with a shorter second distance, a different second rotation, or both, with respect to the first camera 102a and the second camera 102b.

The augmented reality device 100 can determine the updated calibration data 118 substantially concurrently with a determination of 3D points 116a-g represented by the image data, e.g., substantially concurrently with performance of a bundle adjustment process. For example, the augmented reality device 100 can use a first thread, executing on the augmented reality device 100, to determine the updated calibration data 118 and a second thread to determine the 3D points 116a-g.

The augmented reality device 100 includes multiple cameras 102a-c, e.g., the cameras 102. The cameras 102a-c can enable the augmented reality device 100 to capture stereo images 112 of the environment in which the augmented reality device 100 is located. When the cameras 102 capture images 112, the augmented reality device 100 can store the images 112 in a memory 110.

The multiple cameras 102a-c have spatial relationships with respect to each other. One or more of these spatial relationships are represented by the calibration data 118. For example, a first camera 102a is located a first distance $D_1$ and a first rotation $R_1$ away from a second camera 102b. The second camera is located a second distance $D_2$ and a second rotation $R_2$ from a third camera 102c. The calibration data 118 can include data for the first distance $D_1$, the first rotation $R_1$, the second distance $D_2$, and the second rotation $R_2$ for use by the augmented reality device 100 when updating the environment model 120, determining a device trajectory, or determining estimated positions of the cameras 102.

The rotation can indicate a degree of rotation between surfaces of two cameras. For instance, if the augmented reality device 100 is parallel to the group, the first camera 102a can be at a 90° angle with respect to the ground, or a top surface of the augmented reality device 100, and the second camera 102b can be at an 89.1° angle with respect to the ground, or the top surface of the augmented reality device 100. In this example, the rotation degree between the first camera 102a and the second camera 102b can be 0.9°.

The memory 110 can be any appropriate type of memory, e.g., long-term or short-term memory or both. At least a portion of the memory 110 that stores the environment model 120 can be a long-term memory.

A cluster generation engine 104, included in the augmented reality device 100, creates clusters 114 of input data for processing. For example, the cluster generation engine 104 creates clusters 114 of image data from the images 112 stored in the memory 110.

The clusters 114 can be overlapping, non-overlapping, or a combination of both. For instance, some clusters can include data that is also included in another cluster and some clusters can include only data that is not included in another cluster. In some implementations, the cluster generation engine 104 can create the clusters 114 with as little overlap between adjacent clusters as possible. For instance, the cluster generation engine 104 can create clusters 114 that include identifiable objects, represented by 3D points 116a-g, in an overlapping region that is as small as possible.

The cluster generation engine 104 can create clusters 114 of image data using any appropriate process. A cluster 114 can include image data from multiple images or from a single image. The cluster generation engine 104 can create clusters 114 that have a predetermined size, e.g., in bytes or pixels.

The cluster generation engine 104 can create clusters 114 of image data using location data for the augmented reality device 100, timing data, or both. For instance, the cluster generation engine 104 can create a first cluster 114a of image data using images captured during a first time period $T_1$, a second time period $T_2$, and a third time period $T_3$. The images captured during the first time period $T_1$, the second time period $T_2$, and the third time period $T_3$ can be captured at sequential locations in the environment, e.g., a first position, a second position, and a third position. The sequential locations can be approximately continuous, determined based on when the augmented reality device 100 captured key frames, or using another appropriate process.

The cluster generation engine 104 can create a second cluster 114b of image data using images captured during a fourth time period $T_4$, a fifth time period $T_5$, and a sixth time period $T_6$. The images captured during the fourth time period $T_4$, the fifth time period $T_5$, and the sixth time period $T_6$ can be captured at sequential locations in the environment, e.g., a fourth position, a fifth position, and a sixth position.

In some examples, some of the positions at which the augmented reality device 100 captured images can be the same between different clusters. For instance, although the augmented reality device 100 captured sixth image data during the sixth time period, later than the capture of third image data during the third time period, the position at which the augmented reality device 100 captured the third image data and the sixth image data can be the same or substantially the same. This can occur when the augmented reality device 100 remains in substantially the same position for a duration that includes both time periods. The augmented reality device 100 can capture different image data during two different time periods at substantially the same position when the augmented reality device moves on a cyclic path, e.g., in a circle.

The first cluster and the second cluster can include all or a portion of the image data captured by the cameras 102 for the respective time periods, when the augmented reality device 100 was at the respective positions, or both. For instance, the first cluster can include all of the images captured by the cameras 102 during the first time period $T_1$, the second time period $T_2$, and the third time period $T_3$. These images can each depict at least a portion of an object, e.g., a tree, represented at least in part by a second 3D point 116b (the object would likely be represented by multiple different 3D points). The second cluster can include all of the images captured by the cameras 102 during the fourth time period $T_4$, the fifth time period $T_5$, and the sixth time period $T_6$. These images can each depict at least a portion of another object, e.g., a car, represented at least in part by a fourth 3D point 116d.

The cluster generation engine 104 provides data for the clusters 114, e.g., references to the clusters 114, to proximal splitting engines 106 that process the image data for the clusters 114. The proximal splitting engines 106 can divide processing of image data for a cluster 114 into separate tasks, performed by different proximal splitting engines 106, and combine output from the separate tasks, e.g., to reduce processing time necessary to generate the output.

For example, as will be described in more detail below, the proximal splitting engines 106 can use a first proximity operator 108a and a second proximity operator 108b to break of analysis of input data into separate groups. The first proximity operator 108a and the second proximity operator 108b can be separable functions used to solve a single problem, e.g., bundle adjustment, calibration data generation, or both. This can enable the proximal splitting engines 106 to divide the process into multiple parts and enable parallel processing.

The proximal splitting engines 106 can use both of the proximity operators 108a-b to process data for the same cluster to determine corresponding output values. For instance, both of the proximity operators 108a-b can process image data for a first cluster to determine corresponding output values.

The proximal splitting engines 106 combine the outputs from the proximity operators 108a-b to determine a final output value. The outputs can be estimated 3D point 116a-g locations in the environment model 120, estimated positions for the cameras 102 in the environment, e.g., based on a reference position, estimated calibration data 118, or a combination of two or more of these.

For example, the proximal splitting engines 106 provide input data to the two proximity operators 108*a-b*, at least some of which is the same for both of the proximity operators 108*a-b*. The proximal splitting engines 106 can provide, to the first proximity operator 108*a* and the second proximity operator 108*b*, image data for a first cluster 114. The proximal splitting engines 106 can provide, to the first proximity operator 108*a*, projection data that indicates a projection of a point onto the environment model 120. The projection can be an observed image location of the point in the environment model 120. The proximal splitting engines 106 can provide, to the first proximity operator 108*a* and the second proximity operator 108*b*, a prior estimated output value. When the proximal splitting engines 106 are determining estimated calibration data 118, the prior estimated output value can be prior estimated calibration data 118.

The proximal splitting engines 106 can initialize the prior estimated output values using any appropriate process. For instance, the proximal splitting engines 106 can use a coarse method to determine initial estimated output values using a process that is less accurate than the use of the proximity operators 108*a-b*. The proximal splitting engines 106 can provide the initial estimated output values to the proximity operators 108*a-b* as the prior estimated output values.

The proximal splitting engines 106 can combine estimated output values for different clusters. For example, the proximal splitting engines 106 can include a first proximal splitting engine and a second proximal splitting engine. The first proximal splitting engine can provide data for a first cluster to its own first proximity operator 108*a* and second proximity operator 108*b* and receive a corresponding output. The second proximal splitting engine can provide data for a second cluster, that is adjacent to the first cluster, to its own first proximity operator 108*a* and second proximity operator 108*b*. The second cluster is adjacent to the first cluster when both clusters have data for the same 3D point, have image data captured when the cameras 102 had the same spatial relationship, e.g., and did not move with respect to each other, or both.

The proximal splitting engines 106 can then combine the estimated output values from the various proximity operators 108*a-b*. The first proximal splitting engine can combine, e.g., average, the estimated output values from its first proximity operator 108*a* and second proximity operator 108*b*. The second proximity engine can combine, e.g., average, the estimated output values from its proximity operator 108*a* and second proximity operator 108*b*. The proximal splitting engines 106 can then combine the estimated output values from the first proximal splitting engine and the second proximal splitting engine. In some examples, the proximal splitting engines 106 can combine the estimated output values from the proximity operators 108*a-b* for the adjacent clusters in a single step, e.g., by averaging the multiple estimated output values.

The proximal splitting engines 106 can use one or both of the proximity operators 108*a-b* as part of an iterative process. For instance, the proximal splitting engines 106 can use an initial estimated output value as input to the proximity operators 108*a-b* for a first iteration and receive second estimated output values. The proximal splitting engines 106 can then provide the second estimated output values to the proximity operators 108*a-b* as input for a second iteration and receive third estimated output values.

The proximal splitting engines 106 can repeat the iterative process for additional iterations until a threshold is satisfied. The threshold can be a difference between the average estimated output values for the current and the prior iteration. The threshold can be a difference between the average estimated output values and the generated output values for that iteration. The threshold can be a threshold number of iterations for a cluster 114. The threshold can be a threshold processing time for a cluster 114.

In some implementations, the proximal splitting engines 106 provide copies of input data to the proximity operators 108*a-b*. For example, the first proximal splitting engine 106 can provide a first copy of the image data for a first cluster to the first proximity operator 108*a* and a second copy of the image data for the first cluster to the second proximity operator 108*b*. The second proximal splitting engine 106 can provide a third copy of the image data for a second cluster to its own first proximity operator 108*a*, and a fourth copy of the image data for the second cluster to its own second proximity operator 108*b*, e.g., when some of the image data is included in both the first cluster and the second cluster. This can enable the proximity operators 108*a-b* to change the input data during processing separate from the processing by the other proximity operators 108*a-b*, e.g., can enable parallel processing.

The augmented reality device 100 can use the estimated output values for later processing. The estimated output values can represent estimated calibration data 118. The augmented reality device 100 can update the calibration data 118 in the memory 110. The augmented reality device 100 can maintain, in the calibration data 118, original calibration data, e.g., factory calibration data, default calibration data, or both. In some examples, the augmented reality device 100 can use the estimated calibration data 118 to determine estimated camera positions, to update the environment model 120, or both.

The estimated output values can represent estimated 3D points 116*a-g*. The augmented reality device 100 can store the estimated 3D points 116*a-g* in the memory 110. The estimated 3D points 116*a-g* can be associated with the clusters 114*a-b* used to determine the respective estimated 3D points. In some examples, the augmented reality device 100 does not associate the estimated 3D points with the clusters 114*a-b* used to determine the respective estimated 3D points. The augmented reality device 100 can use the estimated 3D points 116*a-g* to update the environment model 120.

The estimated output values can represent estimated camera positions, e.g., for the positions at which the cameras 102 captured the images 112 represented by the corresponding cluster 114*a-b* used to determine the respective estimated camera positions. The augmented reality device 100 can use the estimated camera positions to update the environment model 120.

When determining estimated camera positions, the augmented reality device 100 might not average camera positions for adjacent clusters. For example, the proximal splitting engines 106 can use the first proximity operator 108*a* and the second proximity operator 108*b* to determine estimated camera positions for image data in a first cluster. The image data can represent images 112 captured while each of the cameras 102 was at a single position, e.g., during a single time period and not multiple time periods. The proximal splitting engines 106 can combine the estimated camera positions from the first proximity operator 108*a* and the second proximity operator 108*b* without combining these estimated camera positions with estimated camera positions for another cluster. For instance, the proximal splitting engines can average a first partial estimated camera position determined by the first proximity operator 108a with a second partial estimated camera position determined by the second proximity operator 108b, both for the first cluster. The proximal splitting engines 106 can then perform more iterations as necessary, combining outputs from the two proximity operators 108a-b for each iteration and skipping any combination with adjacent clusters.

In some implementations, the proximal splitting engines 106 can use a proximal weight, e.g., p, when determining estimated output values. The proximal splitting engines 106 can use the proximal weight in the first proximity operator 108a. In some examples, the proximal splitting engines 106 can use the proximal weight in both proximity operators.

The proximal splitting engines 106 can use the proximal weight to help with the convergence process when performing multiple iterations of analysis. The proximal weight can be selected based on a step size for each process iteration. A large proximal weight can be used to make smaller steps for each iteration. A smaller proximal weight can be used to make larger steps for each iteration.

The proximal splitting engines 106 can adjust the value of the proximal weight for some of the process iterations. For example, the proximal splitting engines 106 can use a larger proximal weight during initial process iterations and a smaller proximal weight during later process iterations, e.g., as the proximity operators' 108a-b estimated output values are closer to convergence.

The augmented reality device 100 can include several different functional components, including the cluster generation engine 104, the proximal splitting engines 106, and the proximity operators 108a-b. The various functional components of the augmented reality device 100 may be installed on one or more computers as separate functional components or as different modules of a same functional component. For example, the cluster generation engine 104, the proximal splitting engines 106, the proximity operators 108a-b, or a combination of two or more of these, can be implemented as computer programs installed on one or more computers.

Figure 2:
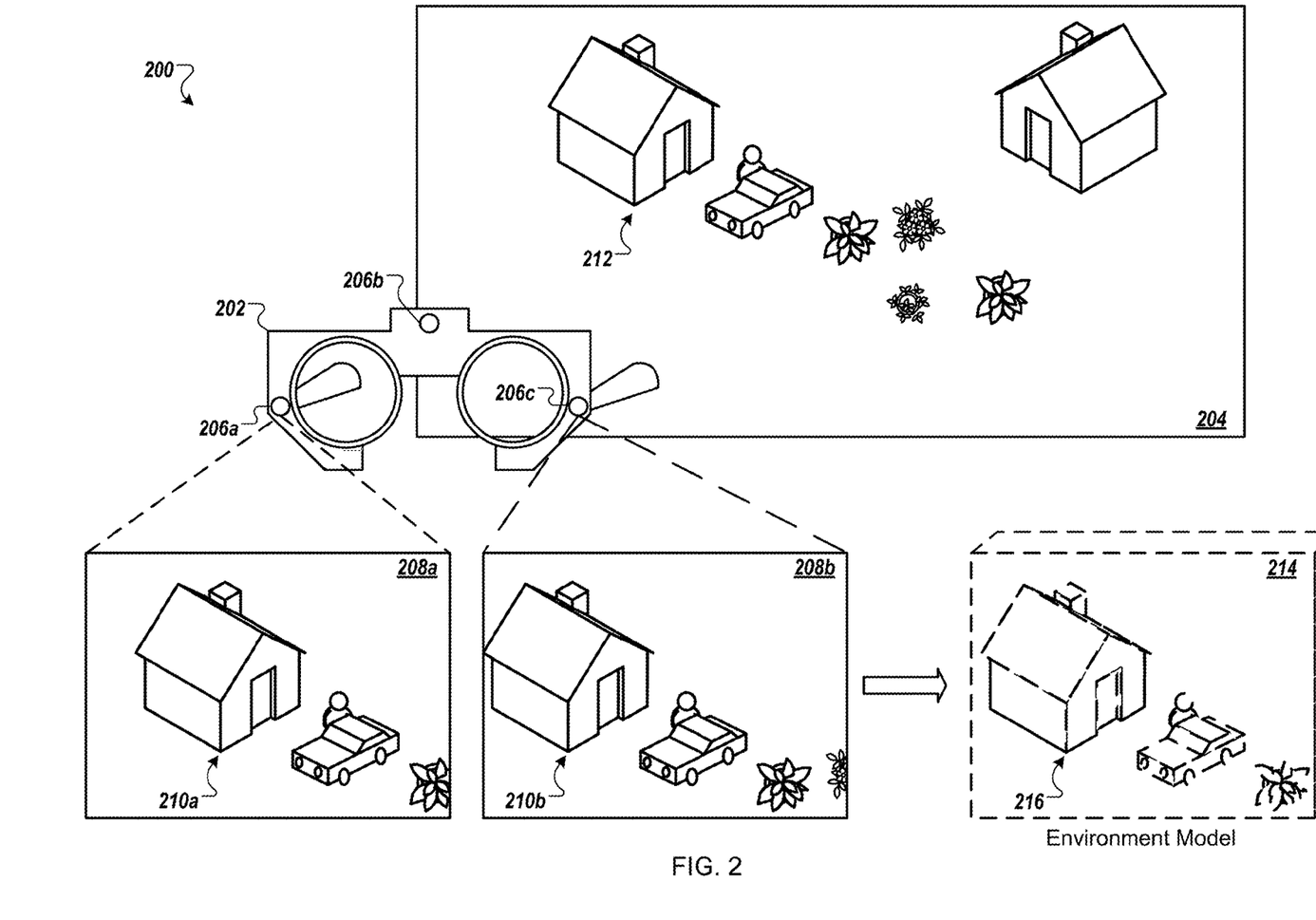
FIG. 2 is an example environment in which a device captures images of a physical environment in which the device is located.

FIG. 2 is an example environment 200 in which a device 202 captures images of a physical environment 204 in which the device is located. The device 202, e.g., the augmented reality device 100 from FIG. 1, includes multiple cameras 206a-c. As the device 202 moves through the physical environment 204, the cameras 206a-c capture images 208a-b. The images 208a-b can include stereo images, e.g., a left image 208a and a right image 208b generated by a left camera 206a and a right camera 206c, respectively.

The device 202 can use data from the images 208a-b to determine locations of objects in the physical environment 204. For instance, the device 202 can process the images 208a-b to determine points 210a-b depicted in the images 208a-b, respectively, that correspond to a point 212 in the physical environment 204. The device 202 can use the depicted points 210a-b to determine a 3D point 216 that corresponds to the point 212 in the physical environment 204, e.g., the corner of the house. The device 202 can use the 3D point 216 to update an environment model 214 of the physical environment 204. The device 202 can use the environment model 214 of the physical environment 204 to present content to a user, e.g., on an eyepiece included in the device 202 or another display.

The device 202 can create an image data cluster that includes data for at least portions of each of the images 208a-b. The image data cluster can include data for a lower left quadrant of each of the images 208a-b that depicts a lower portion of a house.

The device 202 can select data for the image data cluster using any appropriate process. For instance, the device 202 can create an image data cluster based on a time period during which images were captured. The device 202 can include, in an image data cluster, data for images that were captured at substantially the same time, or within a threshold time of each other, e.g., within a few seconds. The device 202 can create an image data cluster based on objects, edges, points, or a combination of these, depicted in the images. The device 202 can use the depicted objects, edges, points, or a combination of these, to determine locations for 3D points 216 that can be used to update an environment model 214 and that correspond to the depicted content.

The device 202 can use the image data cluster as input to a proximal splitting process that generates an estimated output value. The estimated output value can include multiple values, e.g., be a vector or a matric. The estimated output value can be an estimated 3D point location, estimated calibration data, an estimated camera position, or a combination of two or more of these.

The proximal splitting process can use multiple proximity operators $prox_f$ to determine the estimated output value. The proximity operators $prox_f$ can map a function $f$ from H a Hilbert space, to H. The function $f$ can be a proper, convex and lower semi-continuous function $f: H \rightarrow R$, for R the set of real numbers. The proximity operators can use a proximal weight $\rho > 0$. A proximity operator can be defined using Equation (1), below.

$$prox_{f/\rho}(y) = \arg\min_{x \in H}\left(f(x) + \frac{\rho}{2}\|x - y\|^2\right) \quad (1)$$

When the proximal splitting process includes two proximity operators, prox $f_1/\rho$ and prox $f_2/\rho$ the device 202 can use a first proximity operator prox $f_1/\rho$ and a second proximity operator prox $f_2/\rho$ to solve Equations (2) and (3), below, respectively. The solution to Equations (2) and (3) can be part of an optimization problem to determine estimated output values, e.g., estimated 3D points, estimated calibration data, estimated camera positions, or a combination of these.

$$z^{t+1} = prox_{f_1/\rho}(x^t) \quad (2)$$

$$x^{t+1} = x^t - z^{t+1} prox_{f_2/\rho}(2z^{t+1} - x^t) \quad (3)$$

To use multiple proximity operators, the device 202 can partition the Hilbert space H into multiple partitions and use a different proximity operator for each partition. For instance, when using two proximity operators, the device 202 can use partitions $H_1$ and $H_2$ of the Hilbert space H, e.g., such that $H = H_1 \times H_2$. The device 202 can then use a partial proximity operator $prox^\dagger_f$. $H_2 \rightarrow H$, of function $f: H \rightarrow R$. For an initial estimated value x and a prior estimated value y, the device 202 cause use a partial proximity operator $prox^\dagger_f$ as defined using Equation (4), below.

$$prox^\dagger_{f/\rho}(y) = \arg\min_{\begin{bmatrix}x_1\\x_2\end{bmatrix} \in H}\left(f(x_1, x_2) + \frac{\rho}{2}\|x_2 - y\|^2\right) \quad (4)$$

The device 202 can split the m images, captured during a time period t, into 1 disjoint clusters $c_k \in \{1, \ldots, m\}$, $k = 1, \ldots, l$. The combination of the disjoint clusters can be the m images: $\cup_k c_k = \{1, \ldots, m\}$. The intersection of two disjoint clusters can be an empty set, e.g., when each of the clusters do not overlap with any of the other clusters: $c_i \cap c_j = \emptyset$, $\forall i \neq j$. Clusters might not overlap when different clusters include image data that depict a different angle of an object, e.g., a front and a side view. The device 202 can use m*l additional latent variables denoted $\overline{X}_j^k \in R^3$, j=1, ..., m, k=1, ..., l. The device 202 can use a visibility matrix $\overline{w}_j^k$ that represents whether disjoint cluster $c_k$ includes image data for image m. The device 202 can use Equation (5), below, for the visibility matrix $\overline{w}_j^k$.

$$\overline{w}_k^j = \begin{cases} 1, & \exists i \in c_k \text{ s.t. } w_{ij} = 1, \\ 0, & \text{otherwise}. \end{cases} \quad (5)$$

The device 202 can use a projection $\pi(P_i, X_j): Q \times R^3 \to R^2$ to denote a projection, according to a pinhole camera model, of point $X_j \in R^3$ in image i given a camera matrix $P_i \in Q \subseteq R^{3 \times 4}$. The camera matrix $P_i$ can indicate positions of the cameras, e.g., with respect to each other, with respect to a reference point in an environment model, or both. The device can use an observed image location $u_{ij} = [u_{ij}^x u_{ij}^y]^T$. The observed image location $u_{ij}$ can represent the same point $X_j$ as that used for the projection $\pi$. The observed image location $u_{ij}$ can be the projection of point $X_j$ onto a three-dimensional model of the physical environment 204.

The device 202 can use a first function $f_1$, for the first proximity operator, as defined in Equation (6), below.

$$f_1(P, \overline{X}) = \sum_{\substack{1 \leq k \leq l \\ 1 \leq j \leq n \\ i \in c_k}} w_{ij} \|u_{ij} - \pi(P_i, \overline{X}_j^k)\|_2^2 \quad (6)$$

For the first proximity operator $\text{prox}^{\dagger f}{}_1/\rho$, e.g., first partial proximity operator, and based on the first function $f_1$, the device 202 can use $\text{prox}^{\dagger f}{}_1/\rho: R^{3 \times n \times 1} \to Q^m \times R^{3 \times n \times 1}$ as defined in Equation (7), below. Z can be the prior estimated value, e.g., the prior estimated 3D point, prior estimated calibration data, prior estimated camera position, or a combination of these. The device 202 can determine initial values for Z using a less accurate process, e.g., stereo triangulation for an estimated 3D point. The first proximity operator $\text{prox}^{\dagger f}{}_1/\rho$ can be a minimizer of Equation (7), e.g., minimize the error of a difference between an estimated output value $\overline{X}$ and the prior estimated value Z.

$$\text{prox}^{\dagger}_{f/\rho}(Z) = \arg \min_{P_i \in Q\overline{X}} \sum_{\substack{1 \leq k \leq l \\ 1 \leq j \leq n \\ i \in c_k}} w_{ij} \|u_{ij} - \pi(P_i, \overline{X}_j^k)\|_2^2 + \frac{\rho}{2} \|\overline{X} - Z\|_F^2 \quad (7)$$

For the second proximity operator $\text{prox}^{\dagger f}{}_2/\rho$, e.g., second partial proximity operator and discussed above with reference to Equation (3), the device 202 can use an indicator function $\iota_S(a)$ for a set S as defined in Equation (8), below.

$$\iota_S(a) = \begin{cases} \infty, & a \text{ not } \in S \\ 0, & a \in S. \end{cases} \quad (8)$$

The device 202 can use a second function $f_2$, for the second proximity operator, as defined in Equation (9), below.

$$f_2(P, \overline{X}) = \sum_{\substack{1 \leq k \leq l-1 \\ k_1+1 \leq k_2 \leq l \\ 1 \leq j \leq n}} \iota_0\left(\overline{w}_j^{k_1} \overline{w}_j^{k_2}\left(\overline{X}_j^{k_1} - \overline{X}_j^{k_2}\right)\right) \quad (9)$$

The device 202 can use a zero vector $\vec{0}$ as a constraint set S. The device 202 can use a second proximity operator $\text{prox}^{\dagger f}{}_2/\rho$, e.g., second partial proximity operator, based on the second function $f_2$. The device 202 can use the second proximity operator $\text{prox}^{\dagger f}{}_2/\rho$, as defined in Equation (10), below. As with the first proximity operator $\text{prox}^{\dagger f}{}_1/\rho$, Z can be the prior estimated value, e.g., the prior estimated 3D point, prior estimated calibration data, prior estimated camera position, or a combination of these.

$$\left[\text{prox}^{\dagger}_{f_2/\rho}(Z)\right]_j^k = \begin{cases} \dfrac{\sum_{k=1}^l \overline{w}_j^k z_j^k}{\sum_{k=1}^l \overline{w}_j^k}, & \overline{w}_j^k = 1, \\ z_j^k, & \text{otherwise}. \end{cases} \quad (10)$$

For each iteration, the device 202 can generate a first partial output value using the first proximity operator $\text{prox}^{\dagger f}{}_1/\rho$ and a second partial output value using the second proximity operator $\text{prox}^{\dagger f}{}_2/\rho$. The device 202 can combine the partial output values from the first proximity operator $\text{prox}^{\dagger f}{}_1/\rho$ and the second proximity operator $\text{prox}^{\dagger f}{}_2/\rho$. For example, the device 202 can average the first and second partial values together.

In some implementations, the device 202 can average combined partial values for different clusters. For instance, the device 202 can average the combined partial values for adjacent clusters, e.g., that all relate to the same estimated output value. When the estimated output value is 3D points, the device 202 can average the combined values that are each estimates of a location in a model of the physical environment 204 for a particular 3D point. The device 202 can repeat the partial value generation, and averaging of combined partial values for a cluster until a threshold is satisfied. The device 202 can perform this process for each of the clusters.

The device 202 can combine the respective coordinate values. The device 202 can average the x values for the 3D points of adjacent clusters. The device 202 can average the y values for the 3D points of adjacent clusters. The device 202 can average the z values for the 3D points of adjacent clusters.

In some implementations, the device 202 performs an iterative process only for the first proximity operator $\text{prox}^{\dagger f}{}_1/\rho$. For instance, when the second proximity operator $\text{prox}^{\dagger f}{}_2/\rho$ is a closed problem solution, the device 202 does not need to iteratively calculate estimated partial output values for the second proximity operator $\text{prox}^{\dagger f}{}_2/\rho$ and only needs to calculate, for each cluster, one estimated partial output value for the second proximity operator $\text{prox}^{\dagger f}{}_2/\rho$.

Figure 3:
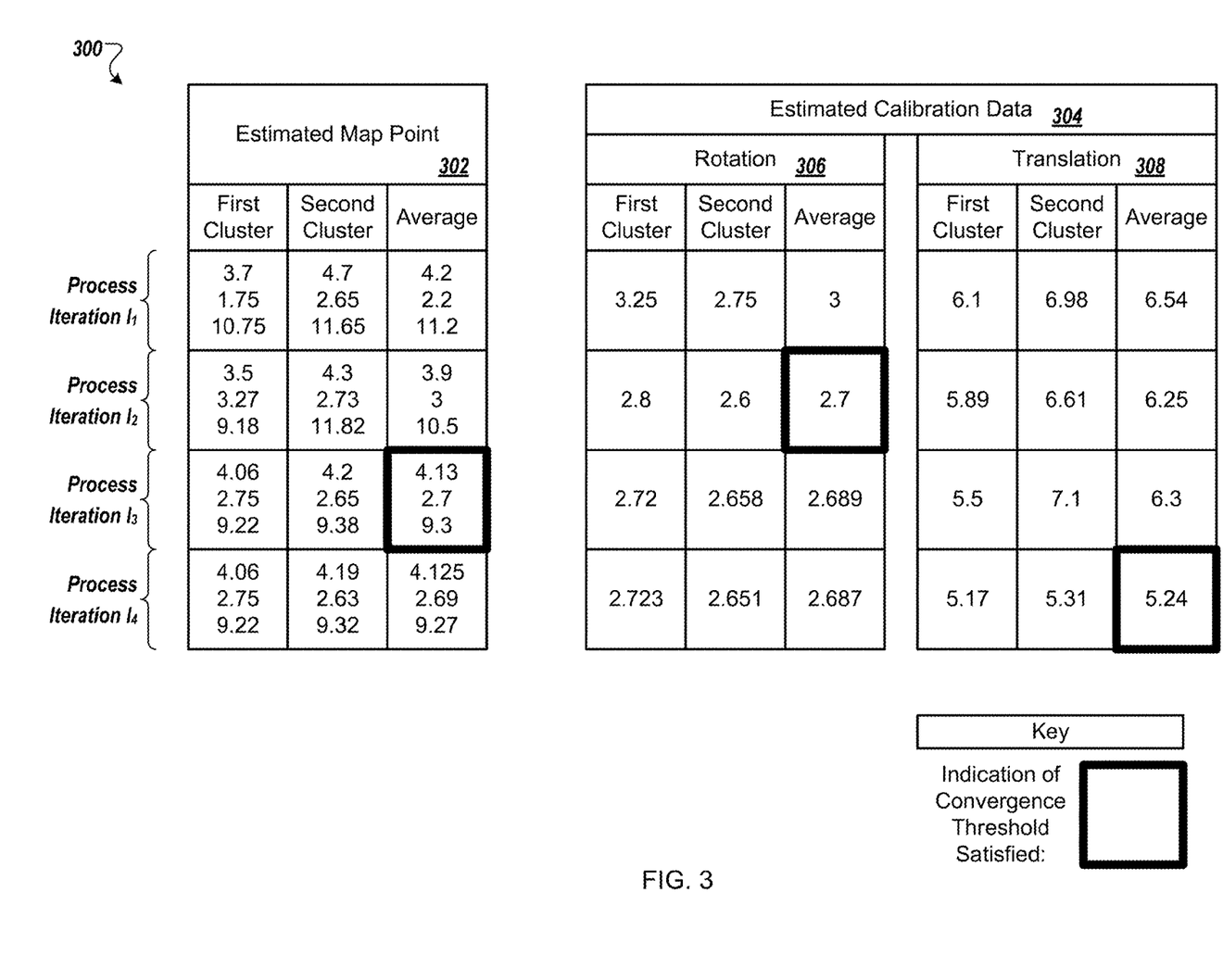
FIG. 3 depicts example estimated output values.

FIG. 3 depicts example estimated output values 300. The estimated output values 300 can include an estimated 3D point 302, estimated calibration data 304, estimated camera positions, or a combination of two or more of these. Although not shown, the estimated camera positions can include estimated values similar to the estimated 3D point 302, e.g., x, y, and z coordinates with respect to a reference point in a model of an environment.

A device, e.g., the augmented reality device 100 from FIG. 1, can determine the estimated output values 300 when analyzing a cluster of image data. The estimated output values 300 include multiple values for different processing iterations. For instance, the device, e.g., one or more proximal splitting engines executing on the device, can determine estimated output values for a first iteration $I_1$, a second iteration $I_2$, a third iteration $I_3$, and a fourth iteration $I_4$. The actual number of iterations used by a device during processing can change based on the input data, the size of the clusters, other parameters, e.g., a desired output value accuracy, or a combination of two or more of these.

Here, the cluster of image data can be for a point in the physical environment 204, discussed with reference to FIG. 2. For instance, the cluster of image data can be for the corner of the house represented by the point 212.

The device can use initial values as input to multiple proximity operators for the first iteration $I_1$. The device can determine the initial values using any appropriate process. The device can determine initial values for the estimated 3D point 302 using a stereo vision triangulation process. The device can determine initial values for the estimated calibration data 304 using prior calibration data, e.g., for a prior time at which the device or another device that includes cameras captured images. The device can determine initial values for camera positions using prior camera positions, inertial data that indicates movement of the device, or both.

Based on the input values, including the initial values, the device determines estimated output values for a first iteration $I_1$. When determining the estimated 3D point 302, the device can determine a first estimated output vector of [3.7, 1.75, 10.75] for a first cluster that includes image data of the 3D point and a second estimated output vector of [4.7, 2.65, 11.65] for a second cluster that includes image data of the 3D point. The combined, e.g., average, estimated output vector in this example is [4.2, 2.2, 11.2].

The device can determine the first estimated output vector using a first proximity operator and a second proximity operator. The device can determine the second estimated output vector using the first proximity operator and the second proximity operator. The device can use separate processes to determine the first estimated output vector and the second estimated output vector substantially concurrently, e.g., using a first proximal splitting engine and a second proximal splitting engine, respectively.

The device can use the combined estimated output vector as input for the proximity operators during a second iteration $I_2$. For instance, both the first proximal splitting engine and the second proximal splitting engine can use the combined estimated output vector, e.g., separate copies of the vector, as input for respective proximity operators.

As part of a third iteration $I_3$, the device can determine that a threshold is satisfied and that the device can stop the iterative process for the estimated 3D point 302. For instance, the device can determine that a third combined, estimated output vector [4.13, 2.7, 9.3], highlighted by the bolded box, is within a threshold distance of each of the first estimated output vector [4.06, 2.75, 9.22] and the second estimated output vector [4.2, 2.65, 9.38], both of which were determined during the third iteration $I_3$. The device can use any appropriate threshold.

The device can use the third combined, estimated output vector as the estimated 3D point 302. The device can store the third combined, estimated output vector in memory, e.g., short-term or long-term memory. The device can use the third combined, estimated output vector to update a model of an environment.

The device can use a similar process to determine the estimated calibration data 304. The estimated calibration data, and any other calibration data described in this document, can include rotation data 306 and translation data 308. The calibration data can represent a relative position of one camera with respect to another camera or a reference point on the device that includes the cameras. The relative positions can be based on a center point of each camera, the reference point, or both. The rotation data 306 can include three values or a vector, e.g., x and y and z, that indicate a relative angular orientation between the two cameras. The rotation data 306 can include a matrix, e.g., a 3×3 matrix or a rotation matrix. The translation data 308 can include a single value, e.g., x, that indicates a distance between the two cameras. The translation data 308 can include multiple values, e.g., a 3×1 vector or a translation vector.

When the device determines the estimated calibration data 304, the device can have one or more thresholds. For instance, the device can use one threshold that indicates when the device should stop iteratively determining updated values for the estimated calibration data 304. The device can use multiple thresholds that indicate when the device should stop iteratively determining updated values for the estimated calibration data 304. The device can have a rotation threshold and a translation threshold. The device can stop iteratively determining updated values when both thresholds are satisfied, e.g., when the device uses rotation data and translation data as input to the same proximity operators. When the device separately determines the rotation data 306 from the translation data 308, e.g., using rotation data as input to a different pair of proximity operators from the translation data, the device can use the respective threshold to determine when to stop iteratively determining updated values for the respective data type.

In one example, the device can determine that a rotation threshold is satisfied during a second iteration $I_2$. When the device is processing the rotation data 306 separately from the translation data, the device can stop the iterative process of determining updated values for the rotation data 306. When the device is processing the rotation data 306 jointly with the translation data 308, the device can determine that the translation threshold is not satisfied and to continue the iterative process of determining updated values for the rotation data 306 and the translation data 308. The device can stop the iterative process after a fourth iteration $I_4$ when both the rotation threshold and the translation threshold are satisfied.

In some implementations, the device determines the estimated 3D point 302 concurrently with the determination of the estimated calibration data 304. The device can use 3D point data as input to a first proximal splitting engine and calibration data as input to a second proximal splitting engine. The device can then use outputs from the two proximal splitting engines to create a more accurate environment map. In some examples, the device can use both 3D point data and calibration data as input to a single proximal splitting engine. In these examples, the device determines estimated 3D points 302 and estimated calibration data 304 during each of the iterations $I_1$, $I_2$, $I_3$, and $I_4$, e.g., using a first proximal splitting engine for the first cluster of data and a second proximal splitting engine for the second cluster of data, both of which determine estimated 3D points 302 and estimated calibration data 304.

The device stops performing additional iterations when a combined threshold, or a threshold for each of the data types, is satisfied. For instance, the threshold for the rotation data 306 can be satisfied after a second iteration $I_2$, the threshold for the 3D point data can be satisfied after a third iteration $I_3$, and the threshold for the translation data 308 can be satisfied after a fourth iteration $I_4$. Here, the device would stop iteratively determining estimated output values after the fourth iteration $I_4$ when all of the individual thresholds are satisfied.

In some implementations, the device can estimate a global device location. The estimation of the global device location can be an estimation of a position, an orientation, or both, for the device with respect to a reference point. The reference point can be a point in the physical environment at which the device was located when the device was turned on, or at which the device was located within a threshold period of time of being turned on. The location can be a location at which the device captured first sensor data after being turned on, e.g., captured a first image after being turned on.

The device can calculate an estimated global device position similar to the calculation of the estimated map point 302, the estimated calibration data 304, or both. For instance, the device can perform a joint determination in which the device jointly determines the estimated map point 302, the estimated calibration data 304, and the estimated global device position.

Figure 4:
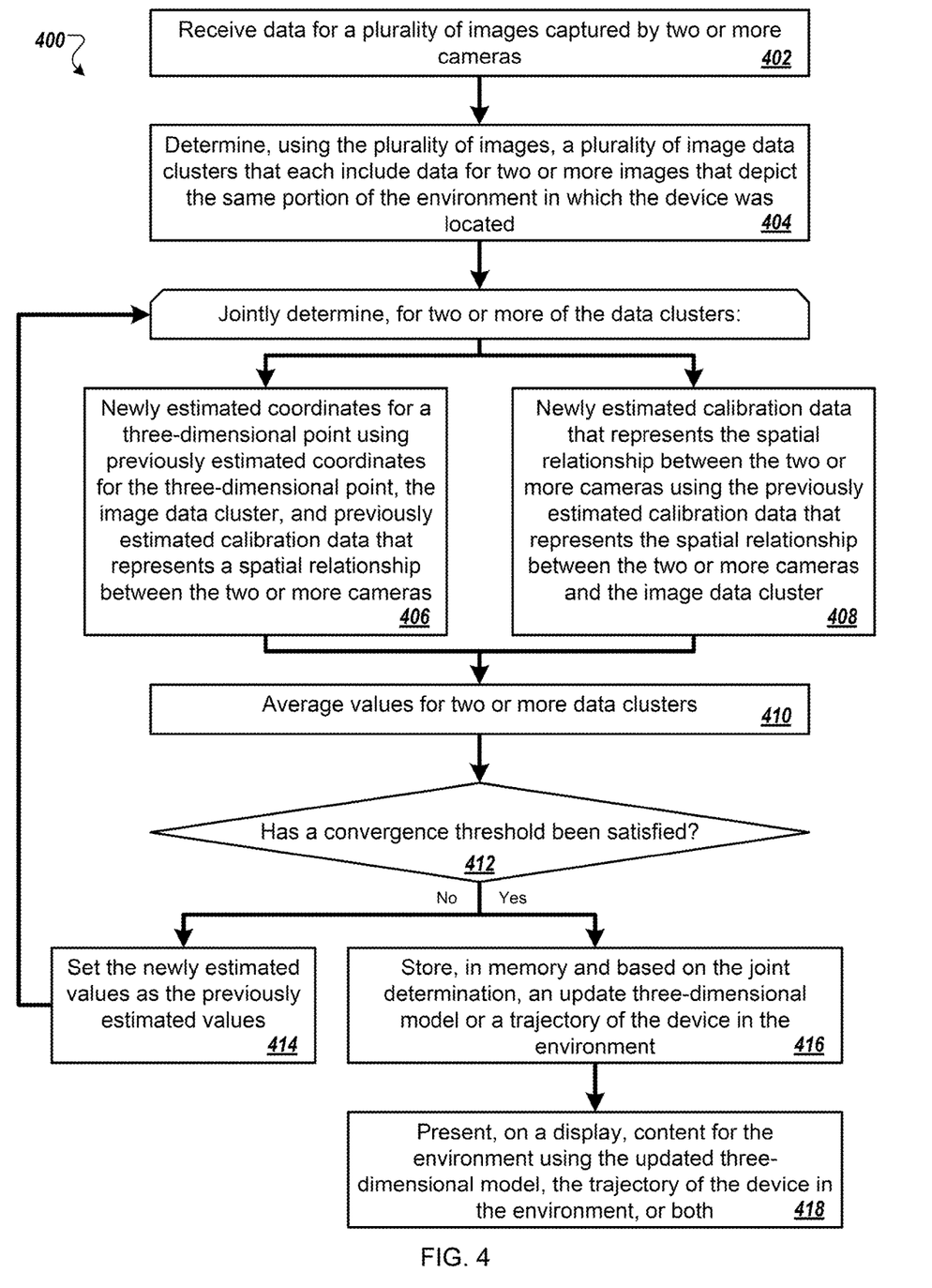
FIG. 4 is a flow diagram of a process for determining estimated output values.

FIG. 4 is a flow diagram of a process 400 for determining estimated output values. For example, the process 400 can be used by a device, such as the augmented reality device 100 from FIG. 1.

A device receives data for a plurality of images captured by two or more cameras (402). For instance, a camera included in the device can capture some of the images and provide the images to another component included in the device, e.g., a memory or a proximal splitting engine. The memory can be a short-term or a long-term memory.

The two or more images can include sets of images, e.g., a set of stereo images that each depict at least some of the same portion of an environment. For instance, each of the images in the set of images can overlap at least partially with the other images in the set. In some examples, the two or more images can include a single pair of images that were captured by two cameras in a stereo setup. The two cameras can be included in the device.

The device determines, using the plurality of images, a plurality of image data clusters that each include data for two or more images that depict the same portion of the environment in which the device was located (404). For example, the device can include a clustering engine that determines the image data clusters from the two or more images.

The device can determine the image data clusters based on a spatial relationship between images, a temporal relationship between images, or both. For instance, the clustering engine can determine that two image sets, e.g., stereo image sets, both depict at least one common object and determine an image data cluster using data for the two image sets. The clustering engine can determine that two image sets were captured during two sequential time periods, e.g., without any intervening time periods between the two sequential time periods, and, in response, create an image data cluster using data for the two image sets.

For two or more of the data clusters, the device jointly determines newly estimated coordinates for a three-dimensional point (406) and newly estimated calibration data that represents the spatial relationship between the two or more cameras (408). For example, the device can analyze data for each of the two or more data clusters in parallel, sequentially, or both, e.g., when the device begins analysis in parallel but finishes analysis for one data cluster before finishing analysis for the other data cluster.

The device can determine the newly estimated calibration data for the same data clusters for which the device determines the newly estimated coordinates. The device can analyze data for different data clusters, when determining newly estimated calibration data, in parallel, sequentially, or both.

The device can perform the joint determination using one or more of i) previously estimated coordinates for the three-dimensional point, ii) the image data cluster, iii) previously estimated calibration data that represents a spatial relationship between the two or more cameras, iv) newly estimated coordinates for the three-dimensional point, or v) newly estimated calibration data that represents the spatial relationship between the two or more cameras. In some implementations, the device can perform the joint determination using an updated three-dimensional model, a trajectory of the device in the environment, or both. For instance, when the joint determination includes a joint determination of newly estimated coordinates, newly estimated calibration data, and an updated model, the device can use the five values above (i-v) and the updated model as part of the joint determination process. When the joint determination includes a joint determination of newly estimated coordinates, newly estimated calibration data, and the trajectory of the device, the device can use the five values above (i-v) and the trajectory of the device as part of the joint determination process.

In some implementations, the device can perform the joint determination as part of a simultaneous localization and mapping ("SLAM") process. For instance, the device can determine initial estimated coordinates for the three-dimensional point and initial estimated calibration data as part of the SLAM process. Because these initial estimates can include noise, the device can provide the initial estimates as input for a joint optimization process, e.g., a bundle adjustment process. The device can use one or more steps from the process 400 for the joint optimization process to increase an accuracy of the estimated coordinates, the estimated calibration data, a three-dimensional model of the environment in which the device is located, a trajectory of the device, or a combination of two or more of these.

The device averages values for two or more data clusters (410). For instance, when the device determines newly estimated coordinates for two or more data clusters, the device can determine data clusters that are adjacent in time, space, or both. The device can average values, e.g., newly estimated coordinates or newly estimated calibration data or both, for the adjacent data clusters.

In some examples, the device averages some of the corresponding values or some of the data for the corresponding values. For example, when the newly estimated coordinates include x-y-z values, the device can average first x-y-z values for a first data cluster with second x-y-z values for a second data cluster. When the newly estimated calibration data includes an estimated location, e.g., of a camera or the device, and translation and rotation data, the device can average first translation data and first rotation data for a first data cluster with second translation data and second rotation data for a second data cluster. The device need not average, e.g., can determine to skip averaging, first estimated location data for the first data cluster with second estimated location data for the second data cluster.

The device determines whether a convergence threshold has been satisfied (412). The convergence threshold can be a number of iterations, a difference between average values for sequential iterations, or both. For instance, the device can have a convergence threshold that indicates that the device should perform at least a minimum number of iterations and the difference between the average value of two sequential iterations should be less than a threshold difference.

In some examples, the device can determine whether a value, other than an average value, has satisfied a convergence threshold. For example, when the device does not average values, e.g., estimated coordinates or estimated calibration data, the device can determine whether the newly estimated values satisfy a convergence threshold.

The device can use the same threshold or different thresholds for each of the value types. For instance, the device can have a first convergence threshold for estimated coordinates and a second, different convergence threshold for estimated calibration data. The different convergence thresholds can be based on different data types for the corresponding values. For example, the first convergence threshold can be based on x-y-z values and the second convergence threshold can be based on translation and rotation values.

In response to determining that the convergence threshold has not been satisfied, the device sets the newly estimated values as the previously estimated values (414). For instance, when the threshold number of iterations has not been performed, or a threshold difference is not satisfied, the device can set the newly estimated values as the previously estimated values and repeat one or more steps of the process 400, e.g., one or more of steps 406, 408, 410, and 412. For instance, the device can determine second newly estimated coordinates using the second previously estimated values, e.g., that were determined in the prior iteration.

In response to determining that the convergence threshold has been satisfied, the device stores, in memory and based on the joint determination, an updated three-dimensional model or a trajectory of the device in the environment (416). For example, the device can determine to stop an iterative process of determining newly estimated values. The device can store the updated model, the trajectory, or both, that were determined as part of the joint determination, e.g., in steps 406 and 408, in memory. The device can store the newly estimated coordinates, the newly estimated calibration data, or both, in memory.

The device presents, on a display, content for the environment using the updated three-dimensional model, the trajectory of the device in the environment, or both (418). The device can present the content after storing the updated three-dimensional model, the trajectory, or both, e.g., in memory. In some examples, the device can present the content substantially concurrently with storing the updated three-dimensional model, the trajectory, or both. For instance, the device can determine the updated three-dimensional model, the trajectory, or both. The device can begin to store the updated three-dimensional model, the trajectory, or both, and before the storing process is complete, the device can begin to present the content for the environment.

The device can present the content for the environment using the corresponding determined data. For example, when the device determines the updated three-dimensional model, the device can present the content using the updated three-dimensional model. When the device determines the trajectory, the device can present the content using the updated three-dimensional model. When the device determines the trajectory, the device can present the content using the updated three-dimensional model, the trajectory, or both.

In some implementations, the device might not perform an iterative process, e.g., the convergence threshold can be a single iteration. In these implementations, the device can perform one or more of steps 402, 404, 406, 408, 410, or 416.

The order of steps in the process 400 described above is illustrative only, and determining the estimated output values can be performed in different orders. For example, the device can determine the newly estimated calibration data before, at the same time, or substantially concurrently with the determination of the newly estimated coordinates. The device can determine the newly estimated calibration data at the same time as the newly estimated coordinates by receiving both values as output from a single process, e.g., performed by a single proximal splitting engine. The device can determine the newly estimated calibration data substantially concurrently with the newly estimated coordinates when a first proximal splitting engine analyzes data to determine the newly estimated calibration data substantially concurrently, e.g., in parallel, with a second proximal splitting engine that analyzes data to determine the newly estimated coordinates.

In some implementations, the process 400 can include additional steps, fewer steps, or some of the steps can be divided into multiple steps. For example, the device can perform steps 406, 408, and 416 without performing the other steps in the process 400. In some examples, the device can perform steps 406, 408, 412, 414, and 416 without performing the other steps in the process 400. The device can perform steps 406, 408, 412, and 416 without perform the other steps in the process 400.

In some implementations, a system can use data from multiple devices for a collaborative mapping process of a physical environment. In these implementations, each of the devices can be physically located in a portion of the physical environment and can capture data, e.g., image data, for that portion of the physical environment. The devices can send at least some, if not all, of the captured data to the system for further analysis. The data captured by a single device can be an image data cluster.

The system receives, from each of two or more of the multiple devices, data captured by the respective device. For instance, the system can receive an image data cluster from each device. The system can then perform one or more steps in the process 400, e.g., step 410, while the devices perform one or more of the other steps in the process 400, e.g., steps 402 through 408 and 412 through 416. Once the system performs the necessary steps, e.g., step 410, the system can send data back to the devices for further processing. For instance, a device can receive an averaged value for two or more data clusters that was generated by the system. The device can then determine whether a convergence threshold has been satisfied and, if not, set the newly estimated values as the previously estimated values and proceed to another iteration of step 406, step 408, or both.

A number of implementations have been described. Nevertheless, it will be understood that various modifications may be made without departing from the spirit and scope of the disclosure. For example, various forms of the flows shown above may be used, with steps re-ordered, added, or removed.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a smart phone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., LCD (liquid crystal display), OLED (organic light emitting diode) or other monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HyperText Markup Language (HTML) page, to a user device, e.g., for purposes of displaying data to and receiving user input from a user interacting with the user device, which acts as a client. Data generated at the user device, e.g., a result of the user interaction, can be received from the user device at the server.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Particular embodiments of the invention have been described. Other embodiments are within the scope of the following claims. For example, the steps recited in the claims, described in the specification, or depicted in the figures can be performed in a different order and still achieve desirable results. In some cases, multitasking and parallel processing may be advantageous.

What is claimed is:

1. A computer-implemented method comprising:
   maintaining, in memory:
      a three-dimensional model of an environment, and
      a plurality of image data clusters that each include data generated from images captured by two or more cameras included in a device, wherein the images represent a portion of the environment in which the device was located; and
   jointly determining, for a three-dimensional point represented by an image data cluster from the plurality of image data clusters and using (i) previously estimated coordinates for the three-dimensional point, (ii) the image data cluster, (iii) previously estimated calibration data that represents a spatial relationship between the two or more cameras, (iv) newly estimated coordinates for the three-dimensional point, and (v) newly estimated calibration data that represents the spatial relationship between the two or more cameras:
      the newly estimated coordinates for the three-dimensional point for an update to the three-dimensional model or a trajectory of the device; and
      the newly estimated calibration data that represents the spatial relationship between the two or more cameras.

2. The method of claim 1, wherein jointly determining the newly estimated coordinates, and the newly estimated calibration data comprises jointly determining, for the three-dimensional point represented by the image data cluster from the plurality of image data clusters:
   the newly estimated coordinates;
   the newly estimated calibration data; and
   either:
      i) an updated three-dimensional model or ii) a trajectory of the device in the environment that includes a physical location for the three-dimensional point; or
      a) the updated three-dimensional model, and b) the trajectory of the device in the environment that includes a physical location for the three-dimensional point.

3. The method of claim 2, comprising:
   presenting, on a display, content for the environment using i) the updated three-dimensional model or ii) the trajectory of the device in the environment or iii) both.

4. The method of claim 1, wherein determining the newly estimated coordinates comprises iteratively determining the newly estimated coordinates by, for each of two or more iterations:
   determining newly estimated coordinates for the three-dimensional point using previously estimated coordinates for the three-dimensional point, the image data cluster, and previously estimated calibration data that represents a spatial relationship between the two or more cameras;
   determining whether a convergence threshold is satisfied; and
   upon determining that the convergence threshold is not satisfied during at least one of the two or more iterations:
      setting the newly estimated coordinates for the three-dimensional point as the previously estimated coordinates for the three-dimensional point; and
      performing a next iteration using the newly estimated coordinates; or
   upon determining that the convergence threshold is satisfied during at least one of the two or more iterations, determining to store the newly estimated coordinates for the three-dimensional point.

5. The method of claim 4, comprising:
   determining, for each of one or more other image data clusters from the plurality of image data clusters that each include data for the three-dimensional point, another newly estimated coordinate for the three-dimensional point;
   wherein setting the newly estimated coordinates for the three-dimensional point as the previously estimated coordinates for the three-dimensional point comprises:
      averaging the newly estimated coordinates for the three-dimensional point and each of the one or more other newly estimated coordinates for the three-dimensional point to determine average estimated coordinates; and
      setting the average estimated coordinates for the three-dimensional point as the previously estimated coordinates for the three-dimensional point.

6. The method of claim 1, comprising:
   averaging, for a first image data cluster and a second image data cluster included in the plurality of image data clusters, a first previously estimated coordinate for the first image data cluster and a second previously estimated coordinate for the second image data cluster to determine an averaged previously estimated coordinate; and
   averaging first previously estimated calibration data for the first image data cluster and second previously estimated calibration data for the second image data cluster to determine averaged previously estimated calibration data, wherein:
      jointly determining the newly estimated coordinates for the three-dimensional point and the newly estimated calibration data using the previously estimated coordinates and the previously estimated calibration data comprises jointly determining the newly estimated coordinates for the three-dimensional point and the newly estimated calibration data using the averaged previously estimated coordinates and the averaged previously estimated calibration data.

7. The method of claim 6, wherein:
calibration data comprises translation data, rotation data, and an estimated location data; and
averaging first previously estimated calibration data for the first image data cluster and second previously estimated calibration data for the second image data cluster to determine averaged previously estimated calibration data comprises:
averaging first translation data for the first image data cluster with second translation data for the second image data cluster;
averaging first rotation data for the first image data cluster with second rotation data for the second image data cluster; and
determining to skip averaging a first estimated location data for the first image data cluster and second estimated location data for the second image data cluster.

8. The method of claim 6, wherein:
jointly determining the newly estimated coordinates for the three-dimensional point and the newly estimated calibration data using the averaged previously estimated coordinates comprises, substantially concurrently:
determining first newly estimated coordinates for the first image data cluster using the first image data cluster and a first copy of the average previously estimated coordinates;
determining second newly estimated coordinates for the second image data cluster using the second image data cluster and a second copy of the average previously estimated coordinates;
determining first newly estimated calibration data for the first image data cluster using the first image data cluster and a first copy of the average previously estimated calibration data; and
determining second newly estimated calibration data for the second image data cluster using the second image data cluster and a second copy of the average previously estimated calibration data.

9. The method of any of claim 6, wherein the first image data cluster and the second image data cluster include image data for adjacent regions in the three-dimensional model.

10. The method of any of claim 6, wherein the first image data cluster includes image data captured during a first time period and the second image data cluster includes image data captured during a second time period that is adjacent to the first time period.

11. The method of claim 1, wherein:
determining the newly estimated coordinates or determining the newly estimated calibration data as part of the joint determination comprises:
receiving, from a first proximity operator, a first partial newly estimated value that the first proximity operator determined using a previously estimated partial value, data for an projection of a point for the image data cluster onto the three-dimensional model, a step size parameter, and a visibility matrix;
receiving, from a second proximity operator, a second partial newly estimated value that the second proximity operator determined using the image data cluster and the visibility matrix; and
combining the first partial newly estimated value and the second partial newly estimated value to determine the newly estimated value.

12. The method of claim 1, comprising:
receiving data for a plurality of images captured by the two or more cameras; and
determining, using the plurality of images, the plurality of image data clusters that each include data for two or more images that depict a same portion of the environment in which the device was located, wherein the two or more images are included in the plurality of images.

13. The method of claim 1, wherein jointly determining the newly estimated coordinates and the newly estimated calibration data comprises:
providing, to a proximal splitting engine, the previously estimated coordinates for the three-dimensional point, the image data cluster, and the previously estimated calibration data that represents a spatial relationship between the two or more cameras; and
receiving, from the proximal splitting engine, the newly estimated coordinates and the newly estimated calibration data.

14. The method of claim 1, wherein:
jointly determining the newly estimated coordinates and the newly estimated calibration data comprises:
providing, to a first proximal splitting engine, the previously estimated coordinates for the three-dimensional point, the image data cluster, and the previously estimated calibration data that represents a spatial relationship between the two or more cameras;
receiving, from the first proximal splitting engine, the newly estimated coordinates;
providing, to a second proximal splitting engine, the image data cluster, and the previously estimated calibration data that represents a spatial relationship between the two or more cameras; and
receiving, from the second proximal splitting engine, the newly estimated calibration data.

15. The method of claim 1, wherein the calibration data identifies, for a pair of cameras in the two or more cameras, a rotation parameter and a translation parameter that represent the spatial relationship between the pair of cameras.

16. The method of claim 1, wherein the calibration data identifies, for a pair of cameras in the two or more cameras, a location of the camera with respect to the environment.

17. The method of claim 1, wherein the environment is a physical environment.

18. The method of claim 1, comprising:
capturing, by each of two or more cameras and substantially concurrently, an image of the environment; and
generating, using the two or more images, each of which was captured by one of the two or more cameras, three-dimensional data that includes, for an object depicted in each of the two or more images, a three-dimensional point for a feature of the object.

19. One or more non-transitory computer storage media storing instructions that, when executed by one or more computers, cause the one or more computers to perform operations, comprising:
maintaining, in memory:
a three-dimensional model of an environment, and
a plurality of image data clusters that each include data generated from images captured by two or more cameras included in a device, wherein the images represent a portion of the environment in which the device was located; and jointly determining, for a three-dimensional point represented by an image data cluster from the plurality of image data clusters and using (i) previously estimated coordinates for the three-dimensional point, (ii) the image data cluster, (iii) previously estimated calibration data that represents a spatial relationship between the two or more cameras, (iv) newly estimated coordinates for the three-dimensional point, and (v) newly estimated calibration data that represents the spatial relationship between the two or more cameras:
   the newly estimated coordinates for the three-dimensional point for an update to the three-dimensional model or a trajectory of the device; and
   the newly estimated calibration data that represents the spatial relationship between the two or more cameras.

20. A system comprising one or more computers and one or more storage devices on which are stored instructions that are operable, when executed by the one or more computers, to cause the one or more computers to perform operations, comprising:

maintaining, in memory:
   a three-dimensional model of an environment, and
   a plurality of image data clusters that each include data generated from images captured by two or more cameras included in a device, wherein the images represent a portion of the environment in which the device was located; and jointly determining, for a three-dimensional point represented by an image data cluster from the plurality of image data clusters and using (i) previously estimated coordinates for the three-dimensional point, (ii) the image data cluster, (iii) previously estimated calibration data that represents a spatial relationship between the two or more cameras, (iv) newly estimated coordinates for the three-dimensional point, and (v) newly estimated calibration data that represents the spatial relationship between the two or more cameras:
   the newly estimated coordinates for the three-dimensional point for an update to the three-dimensional model or a trajectory of the device; and
   the newly estimated calibration data that represents the spatial relationship between the two or more cameras.

* * * * *

UNITED STATES PATENT AND TRADEMARK OFFICE
CERTIFICATE OF CORRECTION

PATENT NO. : 12,406,397 B2
APPLICATION NO. : 18/245816
DATED : September 2, 2025
INVENTOR(S) : Mohamed Souiai, Ankur Gupta and Igor Napolskikh It is certified that error appears in the above-identified patent and that said Letters Patent is hereby corrected as shown below:

In the Claims

Claim 9, Column 25, Line 46, after "method" delete "of any".

Claim 10, Column 25, Line 49, after "method" delete "of any".

Signed and Sealed this
Twenty-first Day of October, 2025

John A. Squires
*Director of the United States Patent and Trademark Office*